United States Patent
Taniguchi

(10) Patent No.: US 11,336,663 B2
(45) Date of Patent: May 17, 2022

(54) RECORDING MEDIUM ON WHICH EVALUATING PROGRAM IS RECORDED, EVALUATING METHOD, AND INFORMATION PROCESSING APPARATUS

(71) Applicant: FUJITSU LIMITED, Kawasaki (JP)

(72) Inventor: Tsuyoshi Taniguchi, Katsushika (JP)

(73) Assignee: FUJITSU LIMITED, Kawasaki (JP)

( * ) Notice: Subject to any disclaimer, the term of this patent is extended or adjusted under 35 U.S.C. 154(b) by 413 days.

(21) Appl. No.: 16/257,638

(22) Filed: Jan. 25, 2019

(65) Prior Publication Data
US 2019/0281075 A1 Sep. 12, 2019

(30) Foreign Application Priority Data
Mar. 7, 2018 (JP) .............................. JP2018-041316

(51) Int. Cl.
*H04L 29/06* (2006.01)
*G06F 21/57* (2013.01)
(Continued)

(52) U.S. Cl.
CPC ........ *H04L 63/1416* (2013.01); *G06F 21/552* (2013.01); *G06F 21/554* (2013.01);
(Continued)

(58) Field of Classification Search
CPC ............. H04L 63/1416; H04L 63/1433; H04L 61/2007; H04L 63/145; H04L 61/6068;
(Continued)

(56) References Cited

U.S. PATENT DOCUMENTS 8,832,832 B1 9/2014 Visbal
9,633,201 B1* 4/2017 Katz ...................... G06Q 40/02
(Continued)

FOREIGN PATENT DOCUMENTS

JP 2015-504542 2/2015
JP 2017034534 A * 2/2017
(Continued)

OTHER PUBLICATIONS

GBSR—The Search Report of Patent Application No. GB1900984.4 in Great Britain dated Jun. 28, 2019.
(Continued)

*Primary Examiner* — Shahriar Zarrineh
(74) *Attorney, Agent, or Firm* — Fujitsu Patent Center

(57) ABSTRACT

A non-transitory recording medium on which an evaluating program related to a cyberattack is recorded, the evaluating program making a computer perform: collecting a plurality of pieces of cyberattack information; analyzing the collected plurality of pieces of cyberattack information; identifying an address of a cyberattack source included in the plurality of pieces of cyberattack information; determining an address group as a monitoring target of the cyberattack based on the identified address; calculating an evaluation value related to reliability of setting the address group as the monitoring target according to a state of detection of a cyberattack from an address included in the determined address group; and performing an output corresponding to the calculated evaluation value.

12 Claims, 16 Drawing Sheets

(51) Int. Cl.
*H04L 61/5007* (2022.01)
*G06F 21/55* (2013.01)

(52) U.S. Cl.
CPC ........ *G06F 21/577* (2013.01); *H04L 61/2007* (2013.01); *H04L 63/145* (2013.01); *H04L 63/1433* (2013.01)

(58) Field of Classification Search
CPC .... G06F 21/577; G06F 21/554; G06F 21/552; G06F 21/55
See application file for complete search history.

(56) References Cited

U.S. PATENT DOCUMENTS

| | | | | |
|---|---|---|---|---|
| 10,015,153 | B1* | 7/2018 | Dotan | H04L 63/083 |
| 10,225,282 | B2* | 3/2019 | Fosdick | H04L 63/1458 |
| 10,594,728 | B2* | 3/2020 | Kuznetsov | G06F 21/55 |
| 11,063,961 | B1* | 7/2021 | Heydari | G08G 5/0056 |
| 11,102,239 | B1* | 8/2021 | Sareshwala | H04L 9/3236 |
| 2001/0017857 | A1* | 8/2001 | Matsukawa | H04L 29/12018 370/392 |
| 2004/0015728 | A1* | 1/2004 | Cole | H04L 63/145 726/23 |
| 2006/0018325 | A1* | 1/2006 | Conrad | H04L 29/12009 370/395.52 |
| 2007/0226796 | A1* | 9/2007 | Gilbert | H04L 63/1425 726/22 |
| 2011/0029902 | A1* | 2/2011 | Bailey | G06Q 30/0277 715/764 |
| 2013/0091580 | A1 | 4/2013 | Maha et al. | |
| 2013/0176125 | A1* | 7/2013 | Beck | G16H 40/67 340/573.1 |
| 2014/0007238 | A1* | 1/2014 | Magee | H04L 63/1408 726/24 |
| 2014/0022942 | A1* | 1/2014 | Han | H04L 61/6068 370/254 |
| 2014/0096251 | A1* | 4/2014 | Doctor | G06F 21/55 726/23 |
| 2014/0283049 | A1 | 9/2014 | Shnowske et al. | |
| 2014/0283085 | A1* | 9/2014 | Maestas | H04L 63/1433 726/25 |
| 2015/0242637 | A1* | 8/2015 | Tonn | H04L 63/1433 726/25 |
| 2015/0373043 | A1* | 12/2015 | Wang | G06F 21/6254 706/12 |
| 2016/0019237 | A1* | 1/2016 | Dan | G06F 16/9537 707/609 |
| 2016/0028759 | A1* | 1/2016 | Visbal | H04L 63/14 726/22 |
| 2016/0044054 | A1* | 2/2016 | Stiansen | H04L 63/1416 726/24 |
| 2016/0134503 | A1* | 5/2016 | Watson | H04L 43/028 709/224 |
| 2016/0301658 | A1* | 10/2016 | Borkar | H04L 61/00 |
| 2017/0048267 | A1 | 2/2017 | Yampolskiy et al. | |
| 2017/0063894 | A1* | 3/2017 | Muddu | G06F 3/04847 |
| 2017/0214709 | A1* | 7/2017 | Maestas | G06F 21/554 |
| 2017/0222922 | A1* | 8/2017 | Zlatokrilov | H04L 61/2007 |
| 2017/0243008 | A1* | 8/2017 | Cornell | G06Q 10/0633 |
| 2017/0331848 | A1* | 11/2017 | Alsaleh | H04L 63/1483 |
| 2018/0063177 | A1* | 3/2018 | Yamada | H04L 63/1408 |

FOREIGN PATENT DOCUMENTS

| | | |
|---|---|---|
| JP | 2017-045188 | 3/2017 |
| KR | 10-1712462 | 3/2017 |

OTHER PUBLICATIONS

GBOA—The Examination Report of Patent Application No. GB1900984.4 in Great Britain dated Feb. 17, 2022. ** All references cited in the GBOA were previously submitted in the IDS filed on Sep. 26, 2019.

* cited by examiner

FIG. 3

```
                                                                    ⎡11
       ┌─────────────────────────────────────────────────────────────┐
       │<stix:STIX_Package ...>                                      │
       │<stix:STIX_Header>                                           │
       │...                                                          │
       │</stix:STIX_Header>                                          │
       │<stix:Observables...>                                        │
       │...                                                          │
       │<cybox:Title> DESCRIPTION OF TITLE OF OBSERVED EVENT_</cybox:Title>
       │...                                                          │
       │<AddressObj:Address_Value> DESCRIPTION OF VALUE OF OBSERVED  │
 11a ─▶│ EVENT_</AddressObj:Address_Value>                           │
       │...                                                          │
       │</stix:Observables>                                          │
       │<stix:Indicators>                                            │
       │...                                                          │
 11b ─▶│<indicator:Title> DESCRIPTION OF TITLE OF indicator </indicator:Title>
       │...                                                          │
       │</stix:Indicators>                                           │
       │<stix:STIX_TTPs>                                             │
       │...                                                          │
 11c ─▶│<ttp:Title> DESCRIPTION OF TITLE OF TTP </ttp:Title>         │
       │...                                                          │
       │</stix:STIX_TTPs>                                            │
       │<stix:Exploit_Targets>                                       │
       │...                                                          │
 11d ─▶│  <et:Title> DESCRIPTION OF TITLE OF Exploit Target </et:Title>
       │...                                                          │
       │</stix:Exploit_Targets>                                      │
       │<stix:Campaigns>                                             │
       │...                                                          │
 11e ─▶│  <campaign:Title> DESCRIPTION OF TITLE OF Campaign </       │
       │campaign:Title>                                              │
       │...                                                          │
       │</stix:Campaigns>                                            │
       │                                                             │
       │<stix:Threat_Actors>                                         │
 11f ─▶│...                                                          │
       │  <ta:Title> DESCRIPTION OF TITLE OF Threat Actor </ta:Title>│
       │...                                                          │
       │</stix:Threat_Actors>                                        │
       │</stix:STIX_Package >                                        │
       └─────────────────────────────────────────────────────────────┘
```

FIG. 5

```
<stix:STIX_Package ...>
<stix:STIX_Header>
...
</stix:STIX_Header>
<stix:Observables...>
...
<cybox:Title> IP addresses </cybox:Title>
...
<AddressObj:Address_Value>XXX.XXX.XXX.XXX</AddressObj:Address_Value>
...
<cybox:Title>Cerber IP addresses </cybox:Title>
...
<AddressObj:Address_Value>YYY.YYY.YYY.YYY</AddressObj:Address_Value>
...
</stix:Observables>
<stix:STIX_TTPs>
...
<ttp:Title> ... </ttp:Title>
...
</stix:STIX_TTPs>
<stix:Campaigns>
...
  <campaign:Title> Campaign1 </campaign:Title>
...
</stix:Campaigns>
...
```

10a (CAMPAIGN 1, ID: 1, 2015)

· AAA.AAA.AAA.251
· BBB.BBB.BBB.4
· CCC.CCC.CCC.23
· CCC.CCC.CCC.53
· AAA.AAA.AAA.217
⋮

FIG. 8C

| ID | IP ADDRESS RANGE | WITHIN-RANGE IP ADDRESS | TIME INFORMATION | whois |
|---|---|---|---|---|
| CAMPAIGN 1-1 | AAA.AAA.AAA.0/22 | ·AAA.AAA.AAA.217<br>·AAA.AAA.AAA.251 | ·2015 | ·REGISTRANT A |
| CAMPAIGN 1-1 | BBB.BBB.BBB.0/27 | ·BBB.BBB.BBB.4 | ·2015 | ·REGISTRANT B |
| CAMPAIGN 1-1 | CCC.CCC.CCC.0/24 | ·CCC.CCC.CCC.23<br>·CCC.CCC.CCC.53 | ·2015 | ·REGISTRANT C |
| CAMPAIGN 1-2 | AAA.AAA.AAA.0/22 | ·AAA.AAA.AAA.11 | ·2016 | ·REGISTRANT A |
| CAMPAIGN 1-3 | AAA.AAA.AAA.0/22 | ·AAA.AAA.AAA.11<br>·AAA.AAA.AAA.88<br>·AAA.AAA.AAA.102 | ·2016 | ·REGISTRANT A |
| CAMPAIGN 1-3 | DDD.DDD.DDD.0/22 | ·DDD.DDD.DDD.14<br>·DDD.DDD.DDD.63<br>·DDD.DDD.DDD.191 | ·2016 | ·REGISTRANT D |
| CAMPAIGN 1-3 | EEE.EEE.EEE.0/24 | ·EEE.EEE.EEE.86<br>·EEE.EEE.EEE.141 | ·2016 | ·REGISTRANT C |
| ⋮ | ⋮ | ⋮ | ⋮ | ⋮ |

FIG. 10A

| ID | IP ADDRESS RANGE | WITHIN-RANGE IP ADDRESS | TIME INFORMATION | whois |
|---|---|---|---|---|
| CAMPAIGN 1-1<br>CAMPAIGN 1-2<br>CAMPAIGN 1-3 | AAA.AAA.AAA.0/22 | ·AAA.AAA.AAA.217<br>·AAA.AAA.AAA.251<br>·AAA.AAA.AAA.11 | ·2015 | ·REGISTRANT A |
| | | ·AAA.AAA.AAA.11<br>·AAA.AAA.AAA.88<br>·AAA.AAA.AAA.102 | ·2016 | ·REGISTRANT A |
| CAMPAIGN 1-1 | BBB.BBB.BBB.0/27 | ·BBB.BBB.BBB.4 | ·2015 | ·REGISTRANT B |
| CAMPAIGN 1-1 | CCC.CCC.CCC.0/24 | ·CCC.CCC.CCC.23<br>·CCC.CCC.CCC.53 | ·2015 | ·REGISTRANT C |
| CAMPAIGN 1-3 | DDD.DDD.DDD.0/22 | ·DDD.DDD.DDD.14<br>·DDD.DDD.DDD.63<br>·DDD.DDD.DDD.191 | ·2016 | ·REGISTRANT D |
| CAMPAIGN 1-3 | EEE.EEE.EEE.0/24 | ·EEE.EEE.EEE.86<br>·EEE.EEE.EEE.141 | ·2016 | ·REGISTRANT C |
| CAMPAIGN 1-3 | CCC.CCC.CCC.0/24 | ·CCC.CCC.CCC.86<br>·CCC.CCC.CCC.141 | ·2016 | ·REGISTRANT C |
| ... | ... | ... | ... | ... |

| ID | IP ADDRESS RANGE | WITHIN-RANGE IP ADDRESS | TIME INFORMATION | whois |
|---|---|---|---|---|
| CAMPAIGN 1-1<br>CAMPAIGN 1-2<br>CAMPAIGN 1-3 | AAA.AAA.AAA.0/22 | ·AAA.AAA.AAA.217<br>·AAA.AAA.AAA.251<br>·AAA.AAA.AAA.11 | ·2015 | ·REGISTRANT A |
| | | ·AAA.AAA.AAA.11<br>·AAA.AAA.AAA.88<br>·AAA.AAA.AAA.102 | ·2016 | ·REGISTRANT A |
| CAMPAIGN 1-1 | BBB.BBB.BBB.0/27 | ·BBB.BBB.BBB.4 | ·2015 | ·REGISTRANT B |
| CAMPAIGN 1-1<br>CAMPAIGN 1-3 | CCC.CCC.CCC.0/24 | ·CCC.CCC.CCC.23<br>·CCC.CCC.CCC.53 | ·2015 | ·REGISTRANT C |
| | | ·CCC.CCC.CCC.86<br>·CCC.CCC.CCC.141 | ·2016 | ·REGISTRANT C |
| CAMPAIGN 1-3 | DDD.DDD.DDD.0/22 | ·DDD.DDD.DDD.14<br>·DDD.DDD.DDD.63<br>·DDD.DDD.DDD.191 | ·2016 | ·REGISTRANT D |
| ⋮ | ⋮ | ⋮ | ⋮ | ⋮ |

| CAMPAIGN NAME | IP ADDRESS RANGE | DEGREE OF RELIABILITY | WITHIN-RANGE IP ADDRESS | TIME INFORMATION | whois |
|---|---|---|---|---|---|
| CAMPAIGN 1 | AAA.AAA.AAA.0/22 | HIGH | ·AAA.AAA.AAA.11<br>·AAA.AAA.AAA.217<br>·AAA.AAA.AAA.251 | ·2015 | ·REGISTRANT A |
| | | | ·AAA.AAA.AAA.11<br>·AAA.AAA.AAA.88<br>·AAA.AAA.AAA.102 | ·2016 | ·REGISTRANT A |
| | CCC.CCC.CCC.0/24 | HIGH | ·CCC.CCC.CCC.23<br>·CCC.CCC.CCC.53 | ·2015 | ·REGISTRANT C |
| | | | ·CCC.CCC.CCC.86<br>·CCC.CCC.CCC.141 | ·2016 | ·REGISTRANT C |
| | DDD.DDD.DDD.0/22 | MEDIUM | ·DDD.DDD.DDD.14<br>·DDD.DDD.DDD.63<br>·DDD.DDD.DDD.191 | ·2016 | ·REGISTRANT D |
| | BBB.BBB.BBB.0/27 | LOW | ·BBB.BBB.BBB.4 | ·2015 | ·REGISTRANT B |
| | | | ·BBB.BBB.BBB.4 | ·2016 | ·REGISTRANT B |
| | FFF.FFF.FFF.0/19 | LOW | ·FFF.FFF.FFF.68 | ·2016 | ·REGISTRANT E |
| | ⋮ | ⋮ | ⋮ | ⋮ | ⋮ |
| CAMPAIGN 2 | ⋮ | ⋮ | ⋮ | ⋮ | ⋮ |

60

RECORDING MEDIUM ON WHICH EVALUATING PROGRAM IS RECORDED, EVALUATING METHOD, AND INFORMATION PROCESSING APPARATUS

CROSS-REFERENCE TO RELATED APPLICATION

This application is based upon and claims the benefit of priority of the prior Japanese Patent Application No. 2018-41316, filed on Mar. 7, 2018, the entire contents of which are incorporated herein by reference.

FIELD

The embodiments discussed herein are related to a recording medium on which an evaluating program is recorded, an evaluating method, and an information processing apparatus.

BACKGROUND

Cyberattacks such as unauthorized access via a network and the like are made.

A related technology is disclosed in Japanese Laid-open Patent Publication No. 2017-45188 and Japanese National Publication of International Patent Application No. 2015-504542.

SUMMARY

According to an aspect of the embodiments, a non-transitory recording medium on which an evaluating program related to a cyberattack is recorded, the evaluating program making a computer perform: collecting a plurality of pieces of cyberattack information; analyzing the collected plurality of pieces of cyberattack information; identifying an address of a cyberattack source included in the plurality of pieces of cyberattack information; determining an address group as a monitoring target of the cyberattack based on the identified address; calculating an evaluation value related to reliability of setting the address group as the monitoring target according to a state of detection of a cyberattack from an address included in the determined address group; and performing an output corresponding to the calculated evaluation value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram of assistance in explaining cyber threat intelligence;

FIG. 5 is a diagram of assistance in explaining an example of extracting elements;

FIG. 6 is a diagram of assistance in explaining a preprocessed cyber threat intelligence database (DB);

FIG. 8C is a diagram of assistance in explaining an IP address range candidate DB;

FIG. 10A is a diagram of assistance in explaining an example of integration;

FIG. 10B is a diagram of assistance in explaining an example of integration;

FIG. 11 is a diagram of assistance in explaining an IP address range DB;

DESCRIPTION OF EMBODIMENTS

Figure 1:
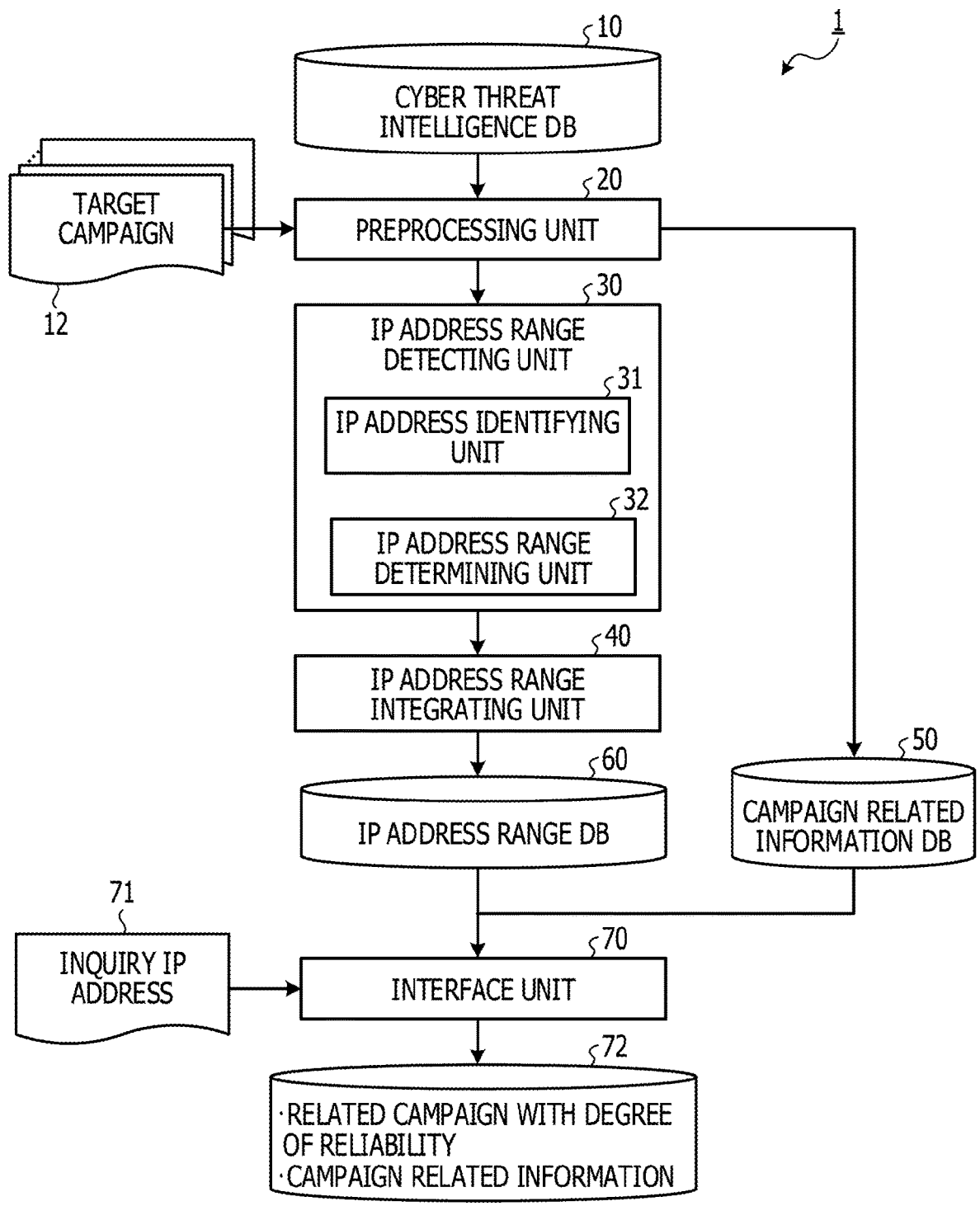
FIG. 1 is a block diagram illustrating an example of a functional configuration of an evaluating device according to an embodiment.

For example, cyberattacks are made by a wide variety of methods. Therefore, in dealing with cyberattacks, it is important to analyze and evaluate, for each cyberattack detected in the past, the event contents of the cyberattack.

For example, in the analysis of event contents, a figure having a different size according to the number of times of occurrence of communication is disposed and displayed according to log information on a coordinate plane in which an axis of ordinates indicates one of a communication destination address and a date and time of occurrence of communication, and an axis of abscissas indicates the other.

Relation between a plurality of cyberattacks and an IP address range mainly used by an attacker of those cyberattacks, for example, may be difficult to know.

In a large-scale attack campaign, for example, a plurality of IP addresses belonging to a same IP address range may be observed. There are cases where such an IP address range is continually used by the same attacker. Such an IP address range may therefore be useful in analyzing the relation to the cyberattacks.

An evaluating program or the like that may evaluate relation between cyberattacks and address groups, for example, may be provided.

An evaluating program, an evaluating method, and an evaluating device according to embodiments will be described in the following with reference to the drawings. Configurations having identical functions in the embodiments are identified by the same reference numerals, and repeated description thereof will be omitted. The evaluating program, the evaluating method, and the evaluating device to be described in the following embodiments merely represent an example, and do not limit the embodiments. The following embodiments may be combined with each other as appropriate within a scope in which no contradiction occurs.

FIG. 1 is a block diagram illustrating an example of a functional configuration of an evaluating device according to an embodiment. An evaluating device 1 according to the embodiment is a computer such as a personal computer (PC) or the like.

As illustrated in FIG. 1, the evaluating device 1 receives an input of a target campaign 12 to be set as a processing target among campaigns related to cyberattacks, and collects cyber threat intelligence corresponding to the target campaign 12 among a plurality of pieces of cyber threat intelligence stored in a cyber threat intelligence DB 10. A campaign is a name given to activities of a series of cyberattacks (aggregate of a plurality of cyberattacks) by a same attacker, a same attack force, or a same attack operation.

Next, the evaluating device 1 analyzes the collected cyber threat intelligence, and stores, in an IP address range DB 60, an address group (IP address range) set as a monitoring target of cyberattacks related to the target campaign 12 and an evaluation value (degree of reliability) related to reliability of setting the address group as a monitoring target. The evaluating device 1 stores related information regarding the target campaign 12 in a campaign related information DB 50.

An address group (IP address range) is obtained by integrating a number of IP addresses as a group. As an address group (IP address range), there is, for example, a group (classless inter-domain routing (CIDR) block) of addresses based on a CIDR notation such as "AAA.AAA.AAA.0/22" or the like. In the present embodiment, a CIDR block is illustrated as an address group (IP address range). However, IP addresses may be grouped by domain, and address groups (IP address ranges) are not particularly limited to CIDR blocks.

The evaluating device 1 outputs output information 72 corresponding to input information 71 input via an input device 102 (see FIG. 13) or the like on a monitor 103 (see FIG. 13) or the like based on the information stored in the campaign related information DB 50 and the IP address range DB 60.

For example, an analyst inputs, to the evaluating device 1, the input information 71 in which an IP address related to a suspicious communication occurring in an own organization of the analyst or the like is set as an "inquiry IP address." The evaluating device 1 refers to the IP address range DB 60 based on the input IP address, and determines that a campaign of an address group corresponding to the input IP address is a related campaign having a suspected relation.

Next, the evaluating device 1 reads an evaluation value (degree of reliability) related to the related campaign from the IP address range DB 60, and outputs the output information 72 including the related campaign with the degree of reliability indicating a degree to which relation to the input IP address is suspected. The evaluating device 1 reads, from the campaign related information DB 50, campaign related information regarding the related campaign from among pieces of campaign related information collected from the cyber threat intelligence for each target campaign 12, and outputs the campaign related information in a state of being included in the output information 72 together with the related campaign with the degree of reliability.

Thus, even when the inquired IP address is an IP address not recognized as cyber threat intelligence, the analyst (user) may evaluate relation to the campaign of cyberattacks based on the related campaign with the degree of reliability. The user may implement a measure to avoid damage from the related campaign whose relation to the inquired IP address is suspected based on the campaign related information regarding the related campaign.

As illustrated in FIG. 1, the evaluating device 1 includes a preprocessing unit 20, an IP address range detecting unit 30, an IP address range integrating unit 40, and an interface unit 70.

The preprocessing unit 20 receives an input of a target campaign 12, and performs preprocessing by collecting cyber threat intelligence corresponding to the target campaign 12 among a plurality of pieces of cyber threat intelligence stored in the cyber threat intelligence DB 10. For example, the preprocessing unit 20 is an example of a collecting unit.

Figure 2:
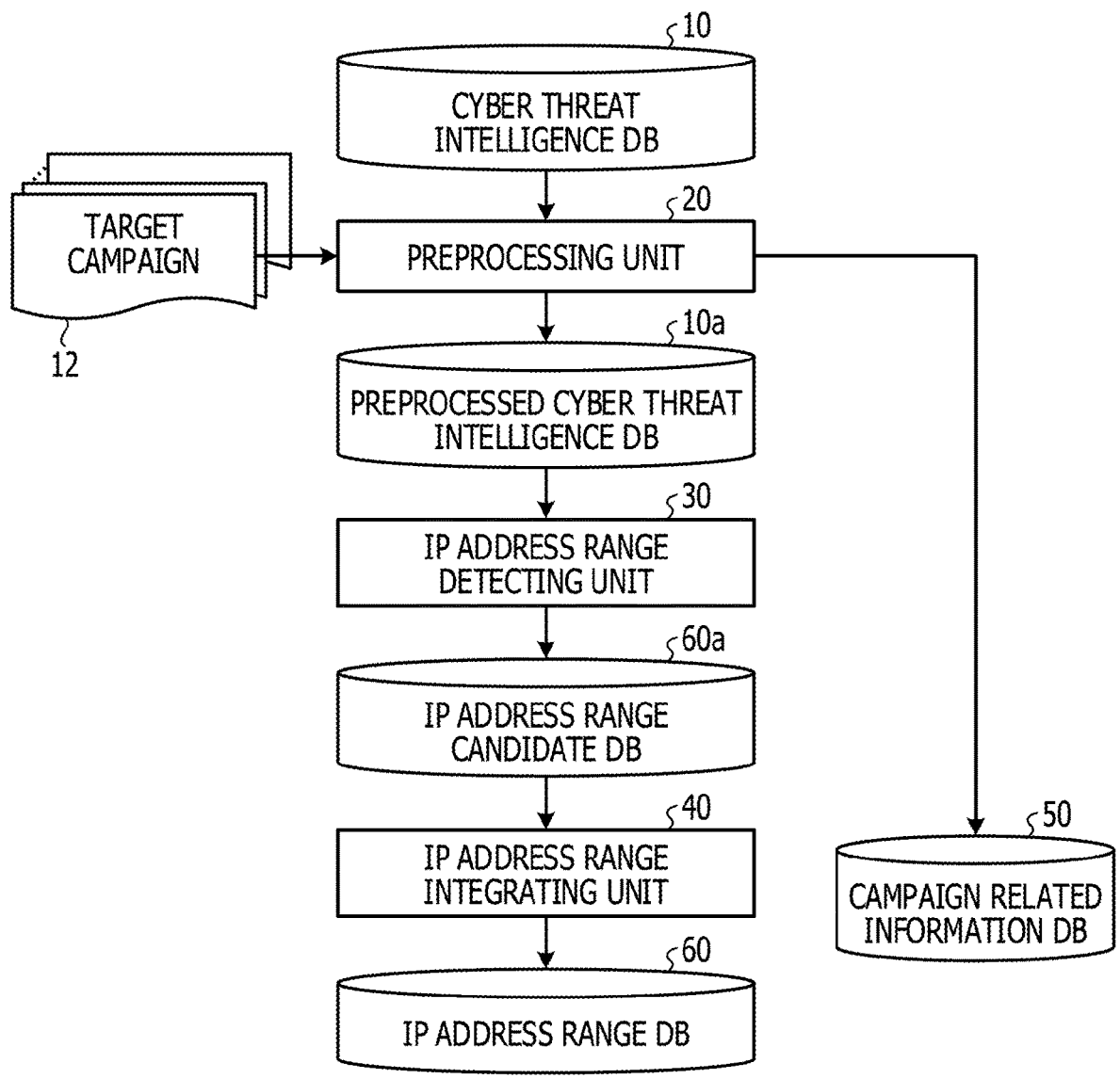
FIG. 2 is a diagram of assistance in explaining an example of a functional configuration related to detection of internet protocol (IP) address ranges.

FIG. 2 is a diagram of assistance in explaining an example of a functional configuration related to detection of IP address ranges. As illustrated in FIG. 2, the preprocessing unit 20 takes the target campaign 12 and the cyber threat intelligence DB 10 as input, performs preprocessing by collecting cyber threat intelligence corresponding to the target campaign 12, and stores data after the preprocessing in a preprocessed cyber threat intelligence DB 10*a* and the campaign related information DB 50.

The preprocessed cyber threat intelligence DB 10*a* is a database storing the data of IP addresses and a time stamp (time information) collected from the cyber threat intelligence in association with a campaign name (or a campaign identifier (ID)) and the ID of the cyber threat intelligence. The campaign related information DB 50 is a database storing related information such as a method, an action, exploited vulnerability, and the like related to the target campaign 12, the related information being collected from the cyber threat intelligence, in association with the campaign name (or the campaign ID).

FIG. 3 is a diagram of assistance in explaining cyber threat intelligence. As illustrated in FIG. 3, in cyber threat intelligence 11, information regarding cyberattacks is described in a format such as structured threat information expression (STIX) or the like. STIX is, for example, constituted of eight information groups of cyberattack activities (Campaigns), attackers (Threat_Actors), attack methods (TTPs), detection indexes (Indicators), observed events (Observables), incidents (Incidents), dealing measures (Courses_Of_Action), and attack targets (Exploit_Targets).

For example, the cyber threat intelligence 11 is an example of cyberattack information. As of an STIX version 1.1.1, the cyber threat intelligence 11 is described in an extensible markup language (XML) format as in FIG. 3.

For example, an observed IP, a domain, a hash value of malware, and the like are described in a region 11*a* enclosed by "Observables" tags. Information representing an index characterizing a cyberattack event is individually described in a region 11*b* enclosed by "Indicators" tags. For example, an index characterizing a cyberattack is described in the region 11*b* together with a tool used to create a detection index from a type of detection index, an observed event related to the detection index, an attack stage phase, a trace, and the like.

An attack method used, for example, spam email, malware, a watering hole attack, or the like, is described in a region 11*c* enclosed by "TTPs" tags. Individually described in a region 11*d* enclosed by "Exploit_Targets" tags is information indicating weaknesses of assets that may be a target of an attack in a cyberattack event, such as the weaknesses of software and a system that may be a target of an attack, from a viewpoint of vulnerability, a kind of vulnerability, settings, configuration, and the like.

A name given to a series of attacks (campaign) or the like is described in a region 11*e* enclosed by "Campaigns" tags. For example, information regarding a campaign of cyberattacks is described in the region 11e. By referring to the name of the campaign in the region 11e, it is possible to identify the campaign to which a cyberattack related to the cyber threat intelligence 11 belongs.

In a region 11f enclosed by "Threat_Actors" tags, information regarding a person/organization that contributes to cyberattacks is described individually from a viewpoint of a type of an attacker of the cyberattacks, a motive of the attacker, a level of skill of the attacker, an intention of the attacker, and the like. For example, information on the IP address or email address of an unauthorized access source (transmission source) or an account of social network service is described in the region 11f.

Thus described in the regions 11a to 11f of the cyber threat intelligence 11 are the observed events of cyberattacks (the IP, the domain, the hash value, and the like) and information indicating characteristics of the cyberattacks such as TTPs or the like, for example, characteristic information (the detection index) of the cyberattacks together with the campaign name representing the campaign of cyberattacks. As a source for sharing the cyber threat intelligence 11, there is open threat exchange (OTX) available free, which is provided by AlienVault, or the like. When a platform for managing the cyber threat intelligence 11 is used, it is possible to check the contents of the cyber threat intelligence 11 and view relation between pieces of cyber threat intelligence 11.

The preprocessing unit 20 performs preprocessing by collecting cyber threat intelligence 11 corresponding to the target campaign 12 from a plurality of pieces of cyber threat intelligence 11 stored in the cyber threat intelligence DB 10, and stores data after the preprocessing in the preprocessed cyber threat intelligence DB 10a and the campaign related information DB 50.

Figure 4:
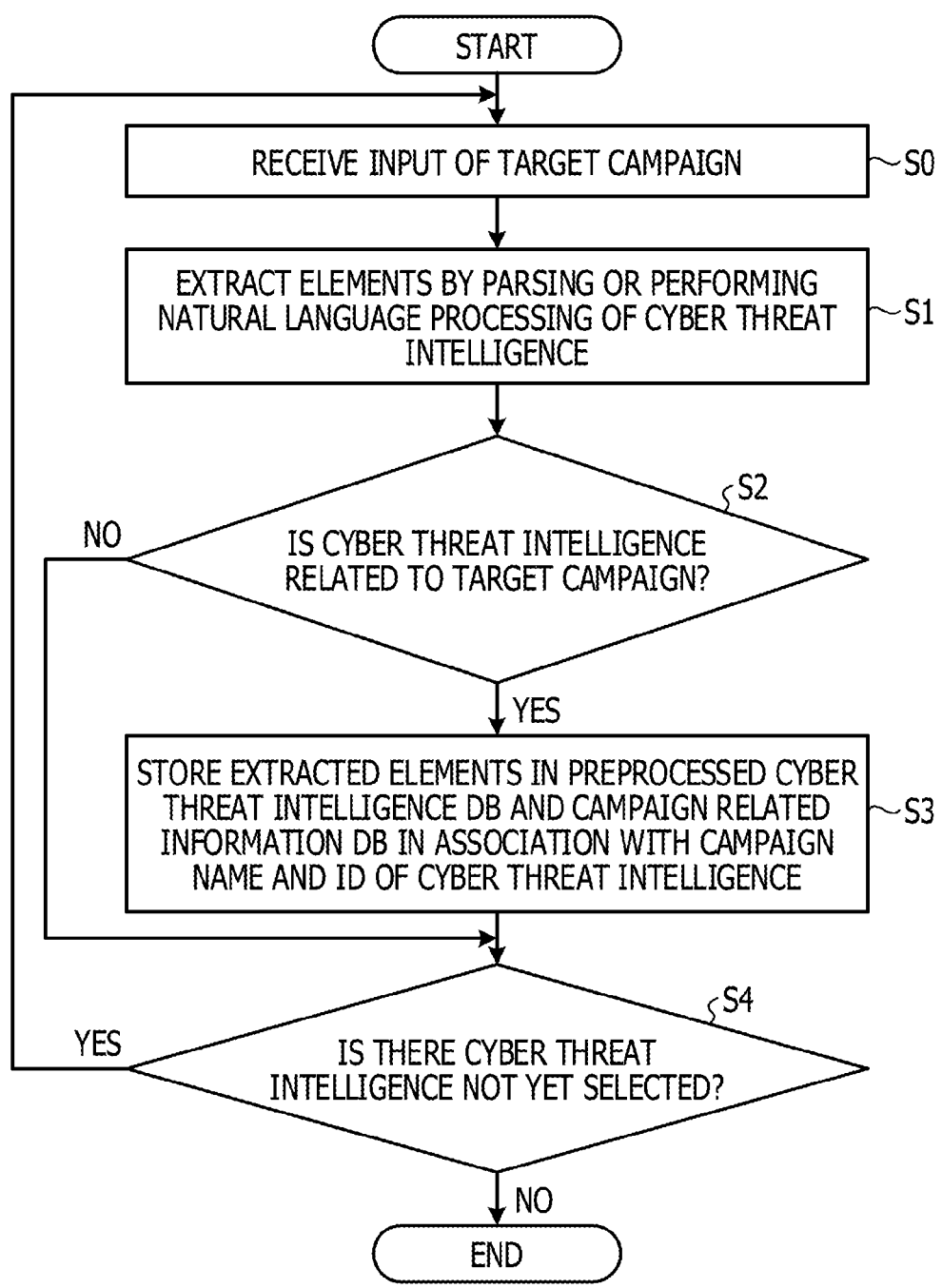
FIG. 4 is a flowchart illustrating an example of preprocessing.

FIG. 4 is a flowchart illustrating an example of preprocessing. As illustrated in FIG. 4, when the preprocessing is started, the preprocessing unit 20 receives an input of a target campaign 12 (S0). As for the target campaign 12, an integrated list of campaign names to be set as a processing target, for example, is input. Next, the preprocessing unit 20 extracts desired data (elements) by parsing or performing natural language processing of cyber threat intelligence 11 stored in the cyber threat intelligence DB 10 (S1).

FIG. 5 is a diagram of assistance in explaining an example of extracting elements. As illustrated in FIG. 5, in the case of the cyber threat intelligence 11 in the STIX format, the preprocessing unit 20 parses the contents of the cyber threat intelligence 11 described in the XML format by a parser. The preprocessing unit 20 thereby extracts each element included in the cyber threat intelligence 11. In a case where the cyber threat intelligence 11 is not structured by the standard or the like but is in a report format based on text or the like, the preprocessing unit 20 may extract the elements to be extracted by using an existing natural language processing tool.

The preprocessing unit 20 extracts IP addresses such as "XXX.XXX.XXX.XXX" and "YYY.YYY.YYY.YYY" or the like from a part enclosed by tags "AddressObj: Address_Value." Similarly, the preprocessing unit 20 extracts an attack method from a part enclosed by tags related to the attack method (TTPs). The preprocessing unit 20 extracts a dealing measure from a part enclosed by tags related to the dealing measure (Courses_Of_Action). The preprocessing unit 20 extracts exploited vulnerability from a part enclosed by tags related to attack targets (Exploit_Targets). The preprocessing unit 20 extracts the name of a campaign from a part enclosed by tags related to the campaign. When data is absent, the absence of data is treated as no information. In a case where the title of the cyber threat intelligence 11 includes a time stamp (time information) as in "report on certain malware, period," the time information is extracted.

Next, the preprocessing unit 20 determines whether or not the cyber threat intelligence 11 is related to the target campaign 12 based on the elements extracted from the cyber threat intelligence 11 (S2). For example, the preprocessing unit 20 determines whether or not the cyber threat intelligence 11 corresponds to the target campaign 12 based on whether or not the campaign name in the elements extracted from the cyber threat intelligence 11 matches the campaign name of the target campaign 12.

When the cyber threat intelligence 11 corresponds to the target campaign 12 (S2: YES), the preprocessing unit 20 stores the data of the elements (the IP addresses and the time stamp) extracted from the cyber threat intelligence 11 in the preprocessed cyber threat intelligence DB 10a in association with the campaign name (or the campaign ID) and the ID of the cyber threat intelligence 11. The preprocessing unit 20 stores the elements (the method, the action, the exploited vulnerability, and the like) extracted from the cyber threat intelligence 11 corresponding to the target campaign 12 in the campaign related information DB 50 in association with the campaign name (or the campaign ID) (S3).

FIG. 6 is a diagram of assistance in explaining a preprocessed cyber threat intelligence DB. As illustrated in FIG. 6, the preprocessed cyber threat intelligence DB 10a stores the IP addresses (AAA.AAA.AAA.251, BBB.BBB.BBB.4, . . . ) extracted from the cyber threat intelligence 11 together with the campaign name (campaign 1) indicating the target campaign 12, the ID (ID:1) of the cyber threat intelligence 11, and the time stamp (2015).

When the cyber threat intelligence 11 does not correspond to the target campaign 12 (S2: NO), the preprocessing unit 20 skips the processing of S3, and proceeds to S4.

Next, the preprocessing unit 20 determines whether or not there is cyber threat intelligence 11 not yet selected for extraction of elements in the cyber threat intelligence DB 10 (S4). When there is cyber threat intelligence 11 not yet selected (S4: YES), the preprocessing unit 20 selects the cyber threat intelligence 11 not yet selected as an object of extraction of elements, and returns the processing to S0. When there is no unselected cyber threat intelligence 11 (S4: NO), the processing is ended for all of the cyber threat intelligence 11, and therefore the preprocessing unit 20 ends the preprocessing.

Returning to FIGS. 1 and 2, the IP address range detecting unit 30 performs IP address range detection processing with the preprocessed cyber threat intelligence DB 10a as input. By this IP address range detection processing, the IP address range detecting unit 30 stores, in an IP address range candidate DB 60a, an IP address range candidate group as a set of IP address ranges detected from each piece of cyber threat intelligence 11 for the target campaign 12.

For example, the IP address range detecting unit 30 includes an IP address identifying unit 31 and an IP address range determining unit 32. The IP address identifying unit 31 analyzes the collected plurality of pieces of cyber threat intelligence 11 by referring to the preprocessed cyber threat intelligence DB 10a, and identifies the addresses of a cyberattack source, the addresses being included in the plurality of pieces of cyber threat intelligence 11. For example, the IP address identifying unit 31 is an example of an identifying unit.

The IP address range determining unit 32 determines an address group (IP address range) as a monitoring target of cyberattacks based on the identified addresses. The IP address range determining unit 32 stores the determined IP address range in the IP address range candidate DB 60a. For example, the IP address range determining unit 32 is an example of a determining unit.

Figure 7:
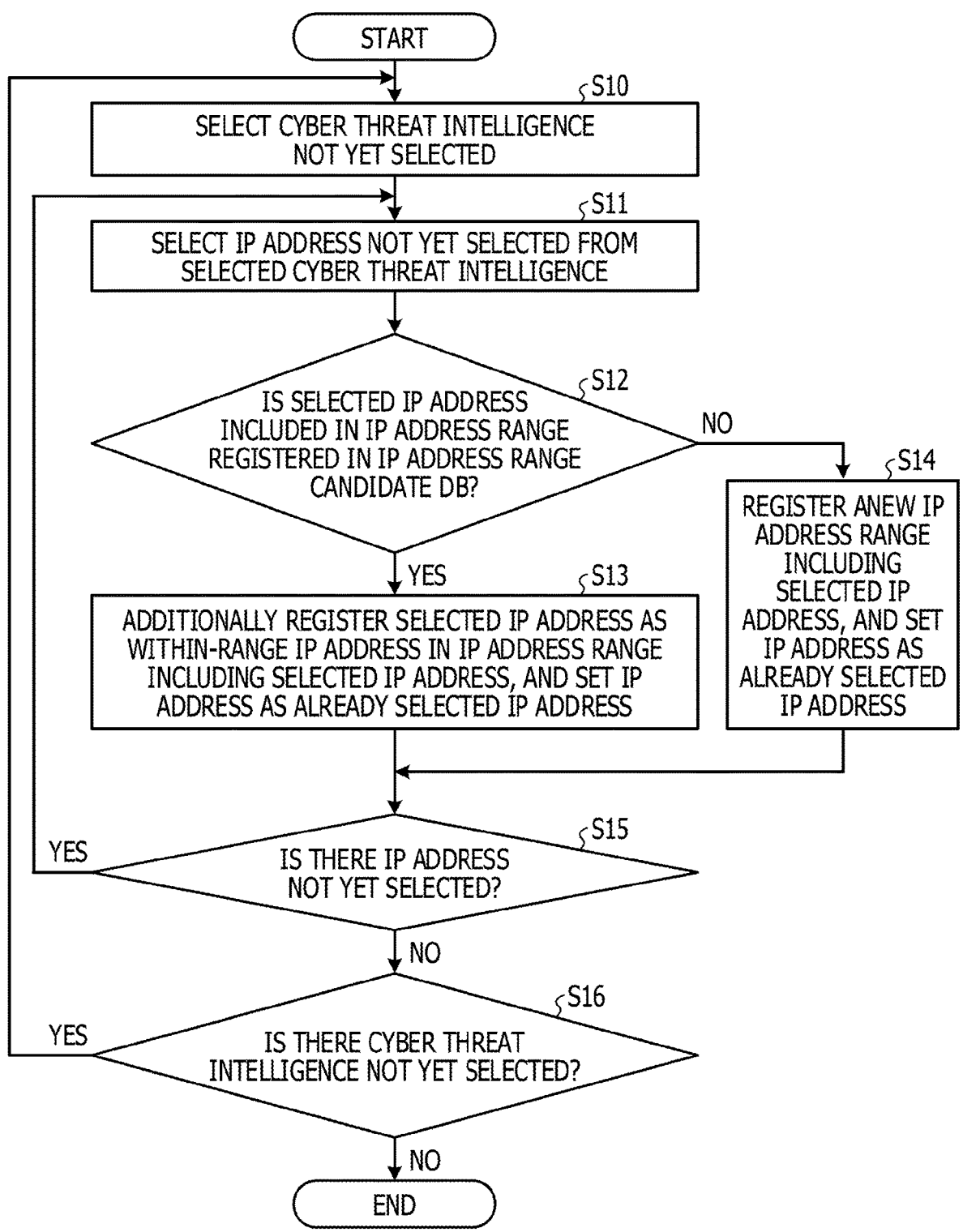
FIG. 7 is a flowchart illustrating an example of IP address range detection processing.

Details of IP address range detection processing will be described in the following. FIG. 7 is a flowchart illustrating an example of IP address range detection processing.

As illustrated in FIG. 7, when the IP address range detection processing is started, the IP address identifying unit 31 selects cyber threat intelligence 11 not yet selected from a group of cyber threat intelligence 11 included in the input preprocessed cyber threat intelligence DB 10a (S10). Next, the IP address identifying unit 31 selects an IP address not yet selected from the selected cyber threat intelligence 11 (S11).

Next, the IP address range determining unit 32 determines whether or not the selected IP address is included in an IP address range registered in the IP address range candidate DB 60a (S12). For example, the IP address range determining unit 32 determines whether or not the selected IP address is included in a CIDR block based on the CIDR notation such as "AAA.AAA.AAA.0/22" or the like registered as an IP address range in the IP address range candidate DB 60a.

When the selected IP address is included (S12: YES), the IP address range determining unit 32 additionally registers the selected IP address as a within-range IP address in an IP address range including the selected IP address, and sets the IP address as an already selected IP address (S13).

When the selected IP address is not included (S12: NO), the IP address range determining unit 32 registers anew the IP address range including the selected IP address in the IP address range candidate DB 60a, and sets the IP address as an already selected IP address (S14). For example, the IP address range determining unit 32 identifies a CIDR block including the selected IP address by using a whois service or the like, and registers anew the identified CIDR block in the IP address range candidate DB 60a.

Next, the IP address identifying unit 31 determines whether or not there is an IP address not yet selected (S15). When there is an IP address not yet selected (S15: YES), the IP address identifying unit 31 returns the processing to S11. When there is no unselected IP address (S15: NO), the IP address identifying unit 31 determines whether or not there is cyber threat intelligence 11 not yet selected from the cyber threat intelligence 11 group (S16). When there is cyber threat intelligence 11 not yet selected (S16: YES), the IP address identifying unit 31 returns the processing to S10. When there is no unselected cyber threat intelligence 11 (S16: NO), the IP address identifying unit 31 ends the IP address range detection processing.

When FIG. 6 is taken as an example, the IP address identifying unit 31 first selects one of five extracted IP addresses (AAA.AAA.AAA.251, BBB.BBB.BBB.4, CCC.CCC.CCC.23, CCC.CCC.CCC.53, and AAA.AAA.AAA.217) from the cyber threat intelligence 11 of "ID:1" of a "campaign 1." The IP address identifying unit 31, for example, selects "AAA.AAA.AAA.251."

Next, the IP address range determining unit 32 determines whether or not an IP address range including the selected IP address "AAA.AAA.AAA.251" is present in the IP address range candidate DB 60a. Here, the IP address "AAA.AAA.AAA.251" is an IP address selected first, and therefore an IP address range including the selected IP address "AAA.AAA.AAA.251" is not present in the IP address range candidate DB 60a. Hence, the IP address range determining unit 32 identifies an IP address range "AAA.AAA.AAA.0/22" including the selected IP address "AAA.AAA.AAA.251" by using the whois service or the like, and registers anew the IP address range "AAA.AAA.AAA.0/22" in the IP address range candidate DB 60a.

Figure 8A:
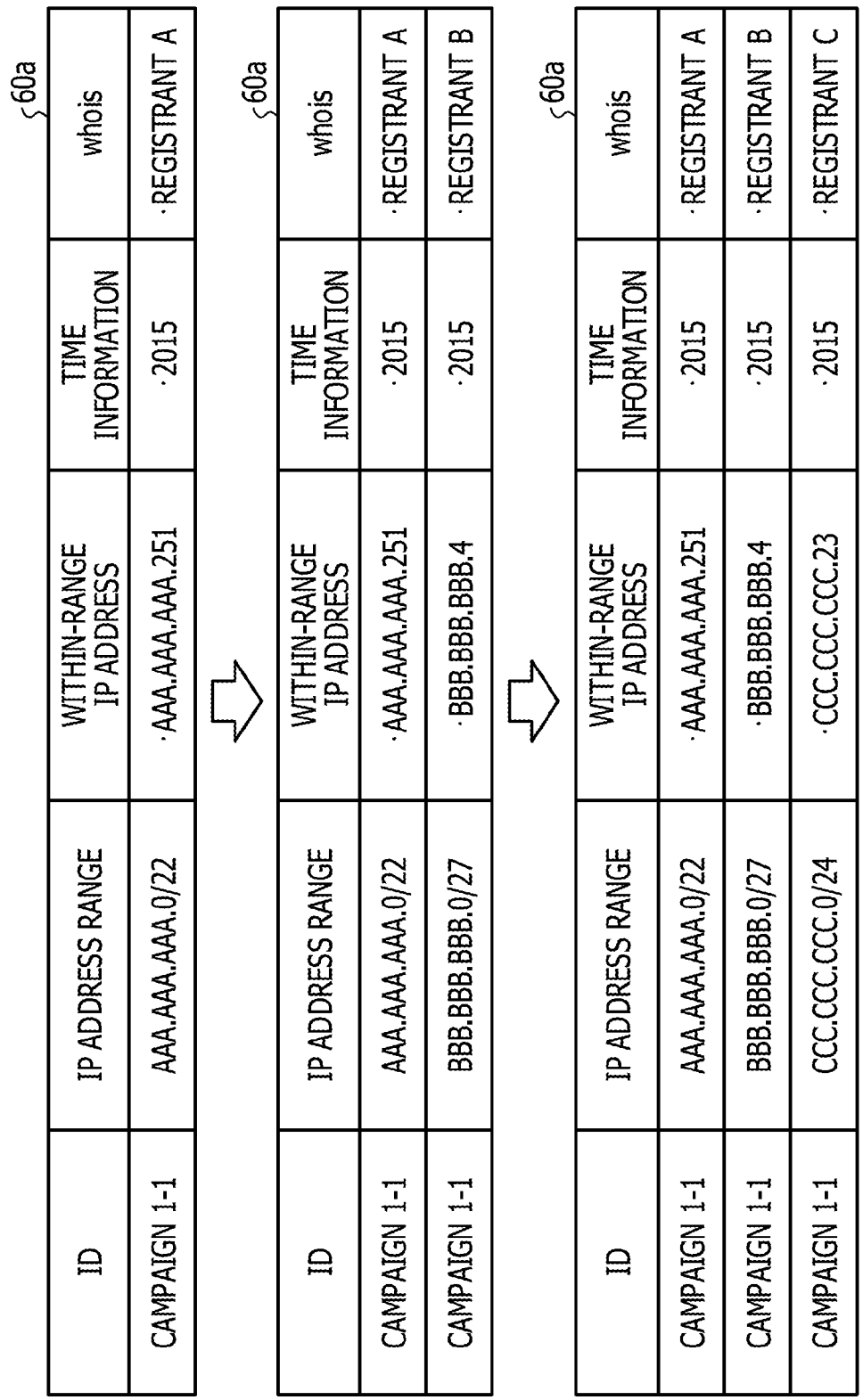
FIG. 8A is a diagram of assistance in explaining an IP address range candidate DB.
Figure 8B:
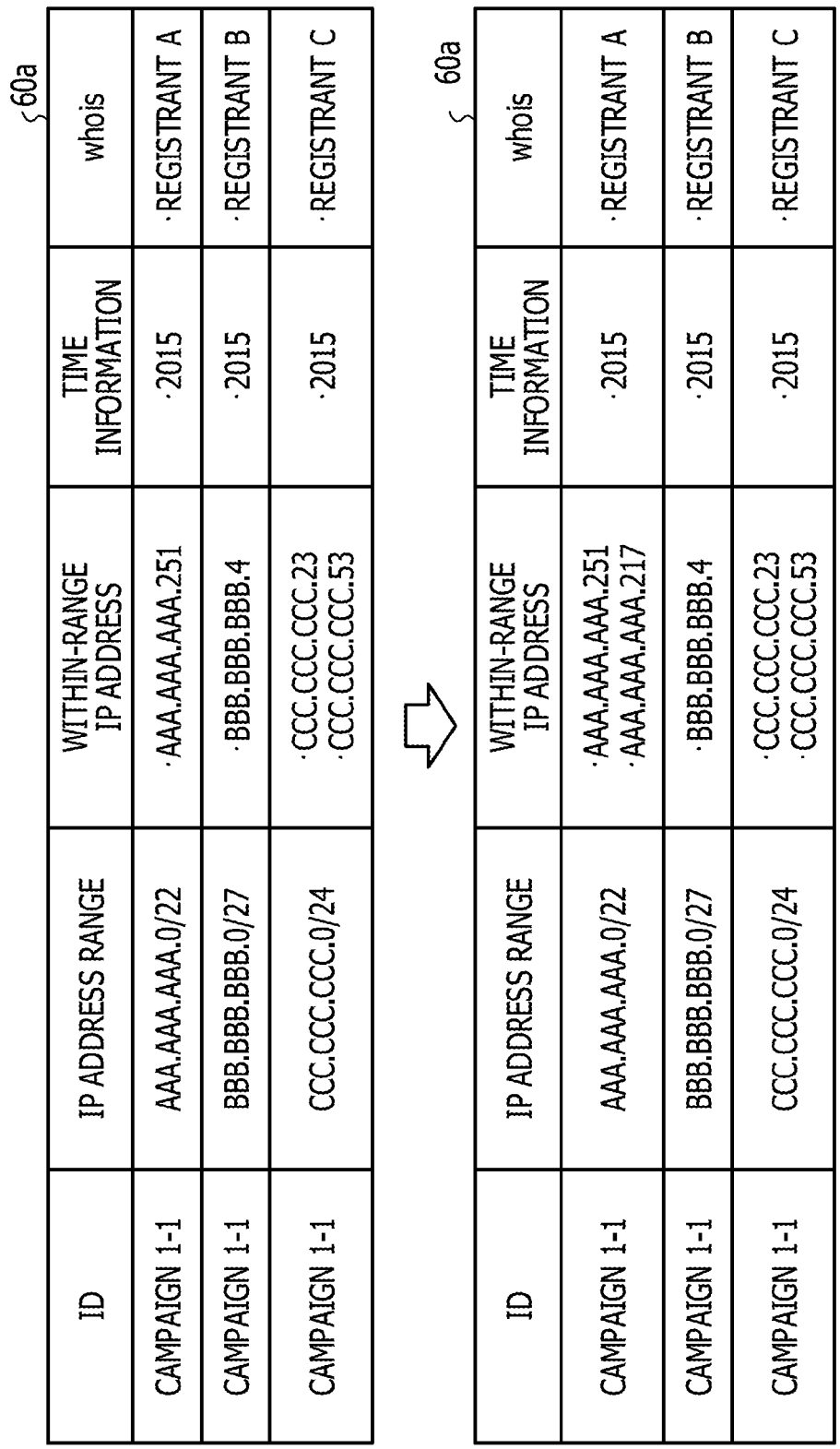
FIG. 8B is a diagram of assistance in explaining an IP address range candidate DB.

FIGS. 8A to 8C are diagrams of assistance in explaining an IP address range candidate DB. As illustrated in FIGS. 8A to 8C, the IP address range candidate DB 60a has items such as an "ID," an "IP address range," a "within-range IP address," "time information," and "whois." The "ID" stores a campaign ID identifying a campaign of cyberattacks or the like. Suppose that in a case of a "campaign 1-1," for example, the description of the ID indicates cyberattacks having a branch number "1" in a "campaign 1."

The "IP address range," for example, stores an address group based on a CIDR block such as "AAA.AAA.AAA.0/22" or the like. The "within-range IP address" stores a registered IP address included in the "IP address range." The "time information" stores a time stamp extracted together with the IP address or the like. "whois" stores information (for example, a registrant) obtained by using the whois service or the like in relation to the "IP address range."

The IP address range candidate DB 60a illustrated in a top part of FIG. 8A represents a result of new registration of the IP address "AAA.AAA.AAA.251." In this new registration, the "campaign 1-1" indicating a campaign related to the IP address "AAA.AAA.AAA.251" is registered as the "ID." "AAA.AAA.AAA.0/22" including the IP address "AAA.AAA.AAA.251" is registered as the "IP address range." The selected IP address "AAA.AAA.AAA.251" is registered as the "within-range IP address."

A time stamp such as "2015" or the like extracted together with the selected IP address "AAA.AAA.AAA.251" is registered as the "time information." While the "time information" is in units of years, the "time information" may be divided in units of months or the like.

Registered as "whois" is registrant information related to the CIDR block, such as a "registrant A" or the like obtained by using the whois service or the like for the "IP address range." "whois" may be the registrant information, and besides, may include a country of the registrant, a registered organization name, or the like.

Next, the IP address range detecting unit 30 repeats the above processing (S11 to S14) until there is no unselected IP address in the preprocessed cyber threat intelligence DB 10a. For example, following "AAA.AAA.AAA.251" in the example of FIG. 6, the IP address range detecting unit 30 selects "BBB.BBB.BBB.4," and performs the processing.

As illustrated in the top part of FIG. 8A, an IP address range including "BBB.BBB.BBB.4" is not present in the IP address range candidate DB 60a. Hence, as illustrated in a middle part of FIG. 8A, the IP address range detecting unit 30 registers anew information related to "BBB.BBB.BBB.4" in the IP address range candidate DB 60a.

Following "BBB.BBB.BBB.4" in the example of FIG. 6, the IP address range detecting unit 30 selects "CCC.CCC.CCC.23," and performs processing. As illustrated in the middle part of FIG. 8A, an IP address range including "CCC.CCC.CCC.23" is not present in the IP address range candidate DB 60a. Hence, as illustrated in a bottom part of FIG. 8A, the IP address range detecting unit 30 registers anew information related to "CCC.CCC.CCC.23" in the IP address range candidate DB 60a.

Following "CCC.CCC.CCC.23" in the example of FIG. 6, the IP address range detecting unit 30 selects "CCC.CCC.CCC.53," and performs processing. As illustrated in the bottom part of FIG. 8A, an IP address range "CCC.CCC.CCC.0/24" including "CCC.CCC.CCC.23" is present in the IP address range candidate DB 60a. Hence, as illustrated in a top part of FIG. 8B, the IP address range detecting unit 30 additionally registers information related to "CCC.CCC.CCC.53" in the IP address range candidate DB 60a.

Following "CCC.CCC.CCC.53" in the example of FIG. 6, the IP address range detecting unit 30 selects "AAA.AAA.AAA.217," and performs processing. As illustrated in the top part of FIG. 8B, an IP address range "AAA.AAA.AAA.0/22" including "AAA.AAA.AAA.217" is present in the IP address range candidate DB 60a. Hence, as illustrated in a bottom part of FIG. 8B, the IP address range detecting unit 30 additionally registers information related to "AAA.AAA.AAA.217" in the IP address range candidate DB 60a.

After these pieces of processing, the IP address range detecting unit 30 selects next cyber threat intelligence 11 and repeats similar processing. FIG. 8C illustrates the IP address range candidate DB 60a after the IP address range detection processing is performed for all of the cyber threat intelligence 11.

Returning to FIGS. 1 and 2, the IP address range integrating unit 40 takes the IP address range candidate DB 60a as input, integrates related IP address ranges by performing integration processing, and outputs the IP address range DB 60. The IP address range integrating unit 40 calculates an evaluation value (degree of reliability) related to reliability of setting an IP address range as a monitoring target according to a state of detection of cyberattacks from addresses included in the integrated IP address range. For example, the IP address range integrating unit 40 is an example of a calculating unit. The IP address range integrating unit 40 stores the calculated evaluation value in the IP address range DB 60 in association with the IP address range.

Figure 9:
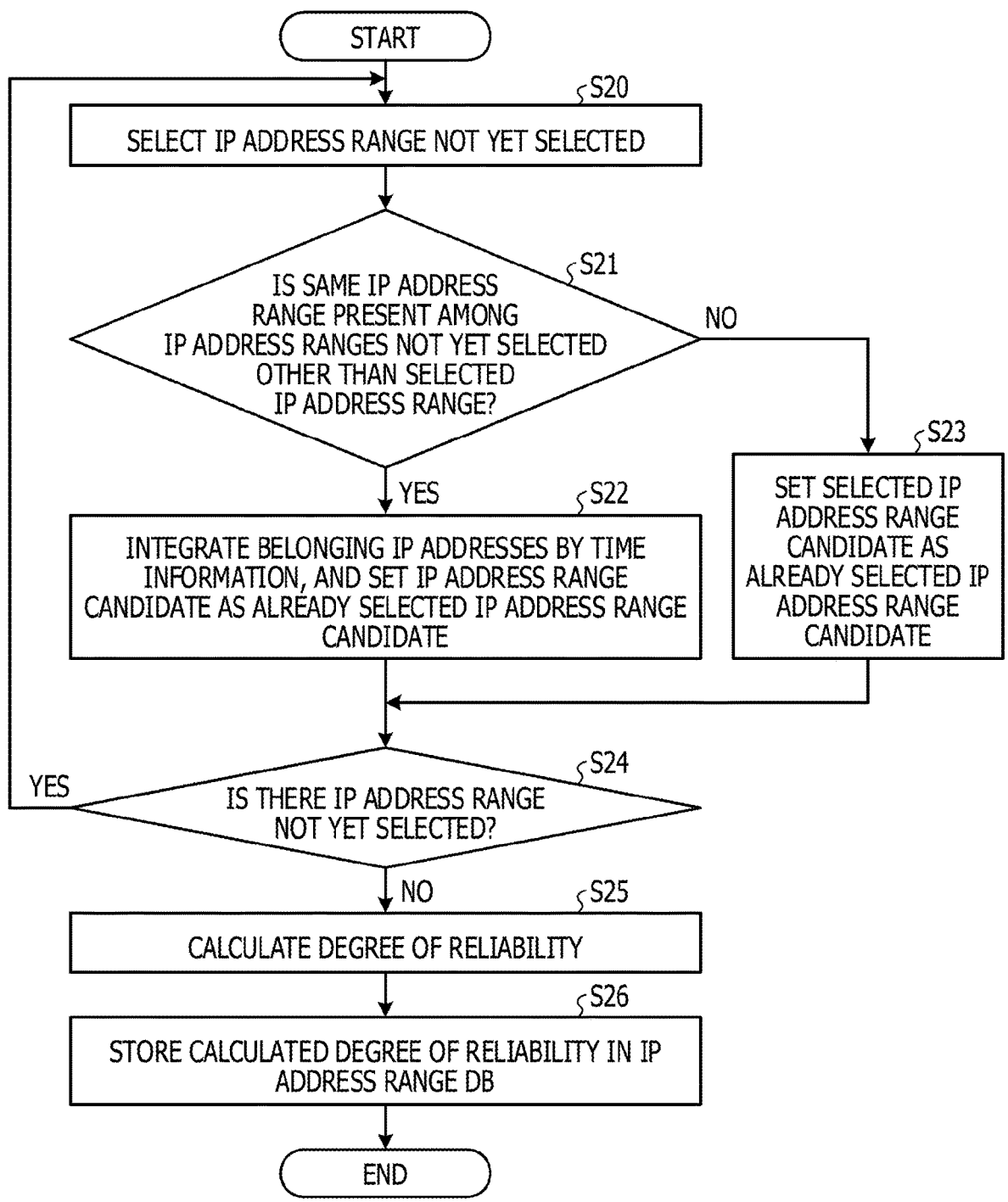
FIG. 9 is a flowchart illustrating an example of integration processing.

Details of the integration processing will be described in the following. FIG. 9 is a flowchart illustrating an example of integration processing.

As illustrated in FIG. 9, when the integration processing is started, the IP address range integrating unit 40 selects an IP address range not yet selected from the IP address range candidate DB 60a (S20).

Next, the IP address range integrating unit 40 determines whether or not the same IP address range is present among IP address ranges not yet selected other than the selected IP address range in the IP address range candidate DB 60a (S21).

When the same IP address range is present (S21: YES), the IP address range integrating unit 40 integrates IP addresses belonging to the IP address range by time information, and sets the IP address range candidate in the IP address range candidate DB 60a as an already selected IP address range candidate (S22).

When the same IP address range is not present (S21: NO), the IP address range integrating unit 40 sets the selected IP address range candidate in the IP address range candidate DB 60a as an already selected IP address range candidate (S23).

Next, the IP address range integrating unit 40 determines whether or not there is an IP address range not yet selected in the IP address range candidate DB 60a (S24). When there is an IP address range not yet selected (S24: YES), the IP address range integrating unit 40 returns the processing to S20. The IP address range integrating unit 40 thereby integrates related IP address ranges.

For example, in the example of FIG. 8C, the IP address range integrating unit 40 first selects "AAA.AAA.AAA.0/22" in a row in which the "ID" is the "campaign 1-1." Next, the IP address range integrating unit 40 determines whether or not there is a same IP address range among IP address ranges not yet selected other than the selected "AAA.AAA.AAA.0/22." In this case, "AAA.AAA.AAA.0/22" is present in rows in which the "ID" is a "campaign 1-2" and a "campaign 1-3." Accordingly, the IP address range integrating unit 40 integrates "within-range IP addresses" in the rows in which the "ID" is the "campaign 1-1," the "campaign 1-2," and the "campaign 1-3" by "time information," and sets the IP address range as an already selected IP address range.

"AAA.AAA.AAA.217" and "AAA.AAA.AAA.251" as the "within-range IP addresses" of the "campaign 1-1" and "AAA.AAA.AAA.11" as the "within-range IP address" of the "campaign 1-2" are integrated with each other with "2015" as the "time information." "AAA.AAA.AAA.11," "AAA.AAA.AAA.88," and "AAA.AAA.AAA.102" as the "within-range IP addresses" of the "campaign 1-3" are integrated with each other with "2016" as the "time information."

FIG. 10A and FIG. 10B are diagrams of assistance in explaining examples of integration. A result of integrating the "within-range IP addresses" of the "campaign 1-1," the "campaign 1-2," and the "campaign 1-3" by "time information" is as in FIG. 10A.

The IP address range integrating unit 40 selects "BBB.BBB.BBB.0/27" as a next IP address range. The same IP address range as "BBB.BBB.BBB.0/27" is not present, and therefore "BBB.BBB.BBB.0/27" is set as an already selected IP address range as it is. Hence, there is no change from the IP address range candidate DB 60a of FIG. 10A.

The IP address range integrating unit 40 selects "CCC.CCC.CCC.0/24" as a next IP address range. The "campaign 1-1" and the "campaign 1-3" as the "ID" have different "time information," and therefore integration is performed without unifying the "time information." A result of the integration is as in FIG. 10B. The IP address range integrating unit 40 selects "DDD.DDD.DDD.0/22" as a next IP address range. However, the same IP address range is not present. The IP address range integrating unit 40 therefore sets "DDD.DDD.DDD.0/22" as an already selected IP address range as it is. The IP address range integrating unit 40 performs this processing for all of IP address ranges in the IP address range candidate DB 60a, ultimately leaves the campaign names in the column of the "ID," and produces an output as IP address ranges.

Returning to FIG. 9, when there is no unselected IP address range in the IP address range candidate DB 60a (S24: NO), the IP address range integrating unit 40 calculates, for each IP address range, a degree of reliability according to a state of detection of cyberattacks from IP addresses included in the IP address range (S25).

For example, the IP address range integrating unit 40 calculates the "degree of reliability" of each IP address range as follows. In a case where IP addresses within the IP address range become different IP addresses with a change in the "time information," the IP address range integrating unit 40 sets the reliability of setting the IP address range as a monitoring target to a "high," for example, highest. In a case where a plurality of different IP addresses belong within the same "time information," the IP address range integrating unit 40 sets the reliability of setting the IP address range as a monitoring target to a "medium," for example, a medium degree. In a case where only one IP address belongs to the IP address range, the IP address range integrating unit 40 sets the reliability of setting the IP address range as a monitoring target to a "low," for example, lowest. The IP address range integrating unit 40 thus calculates a higher evaluation value in a case where cyberattacks are detected from addresses that differ with a change in time among the IP addresses included in the IP address range than in a case where cyberattacks are not detected. The above-described calculating method is an example, and is not limited to this calculating method, and besides, the degree of reliability may be calculated by another method.

Next, the IP address range integrating unit 40 stores the calculated degree of reliability in the IP address range DB 60 in association with the IP address range (S26). FIG. 11 is a diagram of assistance in explaining an IP address range DB.

As illustrated in FIG. 11, the IP address range DB 60 stores a calculated degree of reliability (high, medium, low, or the like) in association with each IP address range in each campaign.

Returning to FIG. 1, the interface unit 70 outputs output information 72 corresponding to input information 71 based on the information stored in the campaign related information DB 50 and the IP address range DB 60. For example, the interface unit 70 refers to the IP address range DB 60 based on an "inquiry IP address" in the input information 71. Here, when the "inquiry IP address" matches a "within-range IP address" in the IP address range DB 60, it is indicated that there is a campaign of cyberattacks corresponding to the "inquiry IP address." Hence, when the "inquiry IP address" and the "within-range IP address" match each other, the interface unit 70 outputs the output information 72 in which a corresponding campaign name is set as determinate information indicating the corresponding campaign of cyberattacks.

In a case where the "inquiry IP address" does not match any "within-range IP address" in the IP address range DB 60, but there is an IP address range including the "inquiry IP address," it is indicated that there is a campaign whose relation is suspected based on campaign activities in the IP address range. Hence, when there is an IP address range including the "inquiry IP address," the interface unit 70 sets a campaign name related to the "IP address range" as that of a campaign whose relation is suspected, and outputs the output information 72 in which an associated degree of reliability (for example, high, medium, or low) is set as an evaluation value indicating the relation.

When there is no campaign related to the "inquiry IP address," the interface unit 70 outputs the output information 72 indicating that there is no campaign related to the "inquiry IP address." The interface unit 70 obtains, from the campaign related information DB 50, campaign related information such as a method, an action, exploited vulnerability, and the like corresponding to the output campaign name, and outputs the campaign related information in a state of being included in the output information 72.

Figure 12:
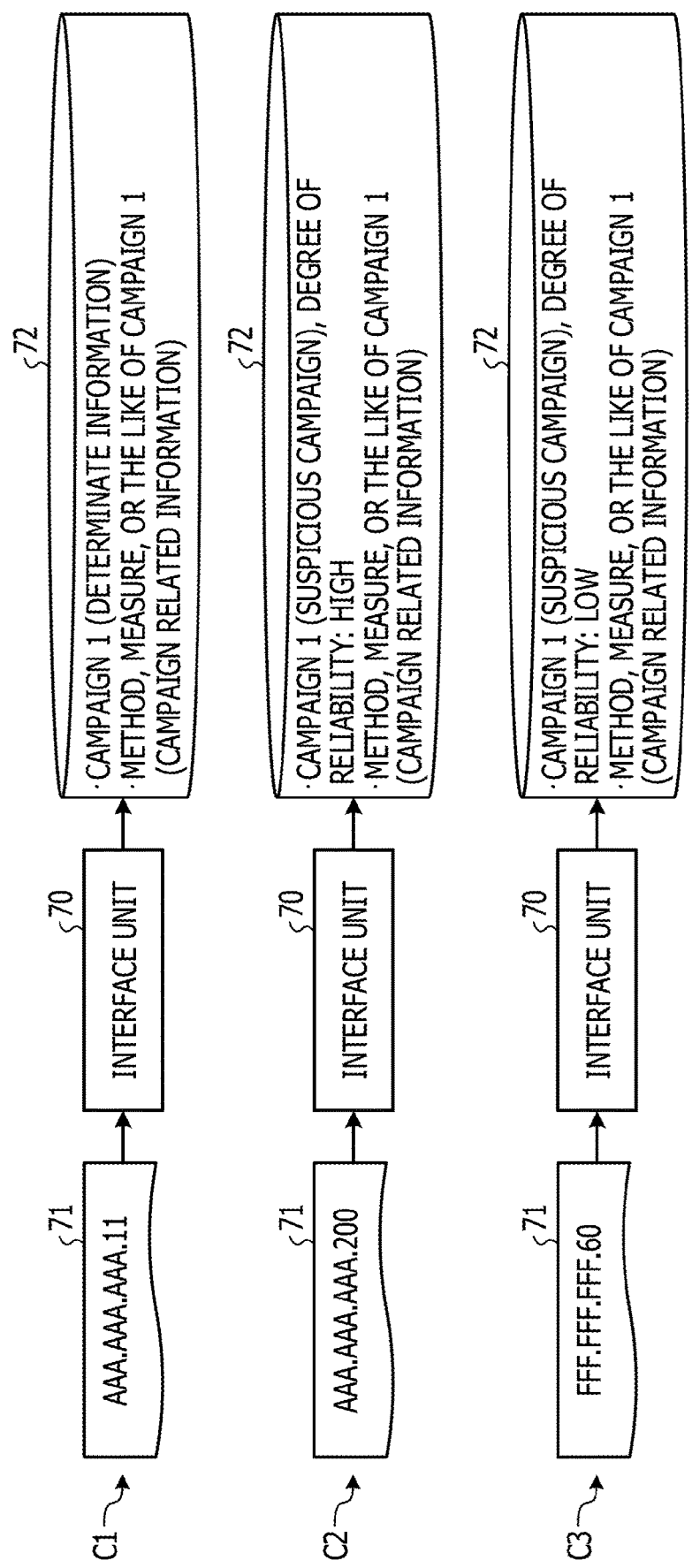
FIG. 12 is a diagram of assistance in explaining a concrete example of output information corresponding to input information.

FIG. 12 is a diagram of assistance in explaining a concrete example of output information corresponding to input information. Suppose that the contents stored in the IP address range DB 60 are as illustrated in FIG. 11.

As illustrated in FIG. 12, in a case C1, the input information 71 having "AAA.AAA.AAA.11" as an inquiry IP address is input. In this case C1, in the IP address range DB 60 (see FIG. 11), the "campaign 1" corresponds, the "campaign 1" having a matching IP address as a "within-range IP address." Hence, the interface unit 70 outputs the output information 72 in which the "campaign 1" is set as determinate information, and which includes the related information of the "campaign 1," the related information being obtained from the campaign related information DB 50.

In a case C2, the input information 71 having "AAA.AAA.AAA.200" as an inquiry IP address is input. In this case C2, in the IP address range DB 60 (see FIG. 11), there is an "IP address range" of "AAA.AAA.AAA.0/22" in which the inquiry IP address does not match any "within-range IP address," but which includes "AAA.AAA.AAA.200." Hence, the interface unit 70 output the output information 72 including the "campaign 1" related to "AAA.AAA.AAA.0/22," a degree of reliability "high," and the related information of the "campaign 1," the related information being obtained from the campaign related information DB 50.

In a case C3, the input information 71 having "FFF.FFF.FFF.60" as an inquiry IP address is input. In this case C3, in the IP address range DB 60 (see FIG. 11), there is an "IP address range" of "FFF.FFF.FFF.0/19" in which the inquiry IP address does not match any "within-range IP address," but which includes "FFF.FFF.FFF.60." Hence, the interface unit 70 outputs the output information 72 including the "campaign 1" related to "FFF.FFF.FFF.0/19," a degree of reliability "low," and the related information of the "campaign 1," the related information being obtained from the campaign related information DB 50.

As described above, the evaluating device 1 includes the preprocessing unit 20, the IP address range detecting unit 30, the IP address range integrating unit 40, and the interface unit 70. The preprocessing unit 20 collects a plurality of pieces of cyber threat intelligence 11 related to a target campaign 12, for example, from the cyber threat intelligence DB 10. The IP address identifying unit 31 of the IP address range detecting unit 30 analyzes the collected plurality of pieces of cyber threat intelligence 11, and identifies an address of a cyberattack source included in the plurality of pieces of cyber threat intelligence 11. The IP address range determining unit 32 of the IP address range detecting unit 30 determines an address group (a group of addresses (CIDR block) based on a CIDR notation such as "AAA.AAA.AAA.0/22" or the like) as a monitoring target of cyberattacks based on the identified address. The IP address range integrating unit 40 calculates an evaluation value (degree of reliability) related to reliability of setting the address group as a monitoring target according to a state of detection of cyberattacks from addresses included in the determined address group. The IP address range integrating unit 40 stores the evaluation value calculated for the address group in the IP address range DB 60. The interface unit 70 performs an output corresponding to the evaluation value stored in the IP address range DB 60 in response to the input information 71.

Thus, for an address group as a monitoring target of cyberattacks, the evaluating device 1 outputs an evaluation value related to the reliability of setting the address group as a monitoring target according to a state of detection of cyberattacks from addresses included in the address group. It is therefore possible to evaluate relation between the cyberattacks and the address group.

The preprocessing unit 20 collects cyber threat intelligence 11 related to activities (campaign) of given cyberattacks such as a target campaign 12 or the like from the cyber threat intelligence DB 10. The evaluating device 1 may thereby evaluate relation between the cyberattacks related to the activities of the given cyberattacks and the address group.

With regard to the evaluation value of the address group, the IP address range integrating unit 40 calculates a higher evaluation value in a case where the cyberattacks are detected from addresses that differ with a change in time among the addresses included in the address group than in a case where cyberattacks are not detected.

As for the cyberattacks, addresses used for the cyberattacks may be slightly changed in time series within the same address group. For example, an attacker of the cyberattacks may change the addresses used for the cyberattacks in time series so that the attack source is not identified. In a case where the addresses used for the cyberattacks are thus changed, the attacker is highly likely to use other addresses within the same address group such as "AAA.AAA.AAA.0/22" or the like. Hence, the evaluation value of the address group is set to be a higher evaluation value in a case where the cyberattacks are detected from addresses that differ with a change in time, and thereby the address group may be evaluated as a suspicious address group that is highly likely to be used for the cyberattacks.

Based on an address group (for example, a CIDR block) including an inquiry target address (for example, an IP address) in the input information 71, the interface unit 70 outputs an evaluation value calculated for the address group. For example, when a certain IP address is observed as a suspicious destination of communication with an own organization of a user, the user sets the observed IP address as the inquiry target address. The user may thereby evaluate relation between an address group including the IP address observed as a suspicious communication destination and cyberattacks. For example, even in the case of an IP address not actually recognized as cyber threat intelligence 11, the user may suspect the relation to cyberattacks based on the evaluation of the relation between the address group including the IP address and cyberattacks, and implement a measure to avoid damage resulting from the cyberattacks.

The respective constituent elements of each device illustrated in the figures may not necessarily need to be physically configured as illustrated in the figures. For example, concrete forms of distribution and integration of each device are not limited to those illustrated in the figures, but the whole or a part of each device may be configured so as to be distributed and integrated functionally or physically in arbitrary units according to various kinds of loads, usage conditions, or the like.

The whole or an arbitrary part of various kinds of processing functions performed in the evaluating device 1 may be performed on a central processing unit (CPU) (or a microcomputer such as a micro processing unit (MPU), a micro controller unit (MCU), or the like). It is needless to say that the whole or an arbitrary part of the various kinds of processing functions may be performed on a program analyzed and executed by a CPU (or a microcomputer such as an MPU, an MCU, or the like) or on hardware based on wired logic. In addition, the various kinds of processing functions performed in the evaluating device 1 may be performed by cloud computing with a plurality of computers in cooperation with each other.

Figure 13:
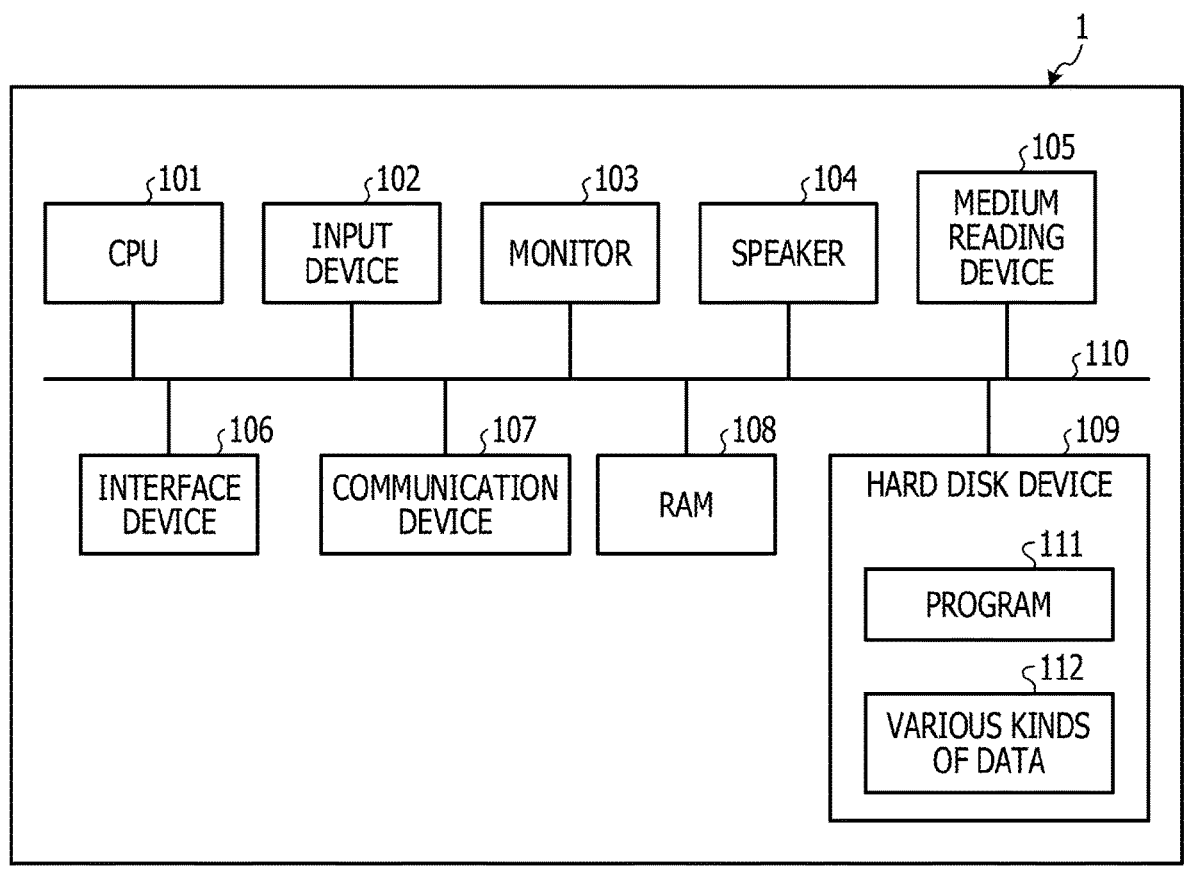
FIG. 13 is a block diagram illustrating an example of a hardware configuration of an evaluating device according to the embodiment.

Various kinds of processing described in the foregoing embodiment may be implemented by executing a program prepared in advance on a computer. Accordingly, the following description will be made of an example of a computer (hardware) that executes a program having functions similar to those of the foregoing embodiment. FIG. 13 is a block diagram illustrating an example of a hardware configuration of an evaluating device according to the embodiment.

As illustrated in FIG. 13, the evaluating device 1 includes a CPU 101 configured to perform various kinds of arithmetic processing, an input device 102 configured to receive data input, a monitor 103, and a speaker 104. The evaluating device 1 includes a medium reading device 105 configured to read a program or the like from a storage medium, an interface device 106 for coupling with various kinds of devices, and a communicating device 107 for communication coupling with an external apparatus by wire or radio. The evaluating device 1 includes a random access memory (RAM) 108 configured to temporarily store various kinds of information and a hard disk device 109. The units (101 to 109) within the evaluating device 1 are coupled to a bus 110.

The hard disk device 109 stores a program 111 for performing various kinds of processing in the preprocessing unit 20, the IP address range detecting unit 30, the IP address range integrating unit 40, the interface unit 70, and the like described in the foregoing embodiment. The hard disk device 109 also stores various kinds of data 112 that the program 111 refers to. The input device 102, for example, receives an input of operation information from an operator. The monitor 103, for example, displays various kinds of screens to be operated by the operator. The interface device 106 is, for example, coupled with a printing device or the like. The communicating device 107 is coupled to a communication network such as a local area network (LAN) or the like, and exchanges various kinds of information with an external apparatus via the communication network.

The CPU 101 performs various kinds of processing related to the preprocessing unit 20, the IP address range detecting unit 30, the IP address range integrating unit 40, the interface unit 70, and the like by reading the program 111 stored in the hard disk device 109, expanding the program 111 in the RAM 108, and executing the program 111. The program 111 may not be stored in the hard disk device 109. For example, the program 111 stored on a storage medium readable by the evaluating device 1 may be read and executed. A portable recording medium such as a compact disc read-only memory (CD-ROM), a digital versatile disc (DVD) disk, a universal serial bus (USB) memory, or the like, a semiconductor memory such as a flash memory or the like, a hard disk drive, or the like, for example, corresponds to the storage medium readable by the evaluating device 1. The program 111 may be stored in devices coupled to a public circuit, the Internet, a LAN, or the like, and the evaluating device 1 may read the program 111 from these devices and execute the program 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium on which an evaluating program related to a cyberattack is recorded, the evaluating program making a computer perform:
   collecting a plurality of pieces of cyberattack information;
   analyzing the collected plurality of pieces of cyberattack information;

identifying a plurality of addresses of a cyberattack source included in the plurality of pieces of cyberattack information;

determining which of a plurality of address ranges, which are classified based on a predetermined notation, each of the plurality of addresses belongs to;

integrating, when the same address is included in one address range of the plurality of address ranges and another address range of the plurality of address ranges, the one address range and the another address range in such a manner the same address is included in an integrated address range;

calculating, for each determined address range, an evaluation value related to reliability of setting the determined address range as the monitoring target according to a state of detection of a cyberattack from an address included in the determined address range; and performing an output corresponding to the calculated evaluation value.

2. The non-transitory recording medium according to claim 1, wherein the collecting collects cyberattack information related to an activity of a given cyberattack.

3. The non-transitory recording medium according to claim 1, wherein the calculating calculates a higher evaluation value in a case where the cyberattack is detected from an address that is different from a previously-detected address with a change in time in the determined address range than in a case where the cyberattack is not detected.

4. The non-transitory recording medium according to claim 1, wherein the performing of the output outputs the evaluation value which is calculated for the determined address range including an inquiry target address.

5. An evaluating method comprising:

collecting, by a computer, a plurality of pieces of cyberattack information;

analyzing the collected plurality of pieces of cyberattack information;

identifying a plurality of addresses of a cyberattack source included in the plurality of pieces of cyberattack information;

determining which of a plurality of address ranges, which are classified based on a predetermined notation, each of the plurality of addresses belongs to;

integrating, when the same address is included in one address range of the plurality of address ranges and another address range of the plurality of address ranges, the one address range and the another address range in such a manner the same address is included in an integrated address range;

calculating, for each determined address range, an evaluation value related to reliability of setting the determined address range as the monitoring target according to a state of detection of a cyberattack from an address included in the determined address range; and performing an output corresponding to the calculated evaluation value.

6. The evaluating method according to claim 5, wherein the collecting collects cyberattack information related to an activity of a given cyberattack.

7. The evaluating method according to claim 5, wherein the calculating calculates a higher evaluation value in a case where the cyberattack is detected from an address that is different from a previously-detected address with a change in time in the determined address range than in a case where the cyberattack is not detected.

8. The evaluating method according to claim 5, wherein the performing of the output outputs the evaluation value which is calculated for the determined address range including an inquiry target address.

9. An information processing apparatus comprising:

a memory; and a processor coupled to the memory and configured to:

collect a plurality of pieces of cyberattack information;

analyze the collected plurality of pieces of cyberattack information;

identify a plurality of addresses of a cyberattack source included in the plurality of pieces of cyberattack information;

determine which of a plurality of address ranges, which are classified based on a predetermined notation, each of the plurality of addresses belongs to;

integrate, when the same address is included in one address range of the plurality of address ranges and another address range of the plurality of address ranges, the one address range and the another address range in such a manner the same address is included in an integrated address range;

calculate, for each determined address range, an evaluation value related to reliability of setting the determined address range as the monitoring target according to a state of detection of a cyberattack from an address included in the determined address range; and perform an output corresponding to the calculated evaluation value.

10. The information processing apparatus according to claim 9, wherein the processor collects cyberattack information related to an activity of a given cyberattack.

11. The information processing apparatus according to claim 9, wherein the processor calculates a higher evaluation value in a case where the cyberattack is detected from an address that is different from a previously-detected address with a change in time in the determined address range than in a case where the cyberattack is not detected.

12. The information processing apparatus according to claim 9, wherein the processor outputs the evaluation value which is calculated for the determined address range including an inquiry target address.

* * * * *